(12) United States Patent
Meder

(10) Patent No.: US 12,212,024 B2
(45) Date of Patent: Jan. 28, 2025

(54) FUEL SUPPLY ARRANGEMENT FOR A FUEL CELL SYSTEM AND FUEL CELL SYSTEM

(71) Applicant: PROTON MOTOR FUEL CELL GMBH, Puchheim (DE)

(72) Inventor: Quirin Meder, Schondorf am Ammersee (DE)

(73) Assignee: PROTON MOTOR FUEL CELL GMBH, Puchheim (DE)

( * ) Notice: Subject to any disclaimer, the term of this patent is extended or adjusted under 35 U.S.C. 154(b) by 309 days.

(21) Appl. No.: 16/468,670

(22) PCT Filed: Dec. 14, 2017

(86) PCT No.: PCT/EP2017/082905
§ 371 (c)(1),
(2) Date: Jun. 11, 2019

(87) PCT Pub. No.: WO2018/114623
PCT Pub. Date: Jun. 28, 2018

(65) Prior Publication Data
US 2019/0348696 A1 Nov. 14, 2019

(30) Foreign Application Priority Data
Dec. 21, 2016 (DE) .................. 10 2016 125 165.8

(51) Int. Cl.
*H01M 8/04082* (2016.01)
*B63H 21/38* (2006.01)
(Continued)

(52) U.S. Cl.
CPC ........ *H01M 8/04201* (2013.01); *B63H 21/38* (2013.01); *H01M 8/04097* (2013.01);
(Continued)

(58) Field of Classification Search
None
See application file for complete search history.

(56) References Cited

U.S. PATENT DOCUMENTS

2003/0148167 A1 8/2003 Sugawara et al.
2003/0180599 A1 9/2003 Kamihara
(Continued)

FOREIGN PATENT DOCUMENTS

DE 10251878 A1 7/2003
DE 102005009674 A1 8/2006
(Continued)

OTHER PUBLICATIONS

Machine translation of JP-2014154385-A (Tejima) (Year: 2014).*
(Continued)

*Primary Examiner* — Stephan J Essex
(74) *Attorney, Agent, or Firm* — ARC IP Law, PC; Joseph J. Mayo

(57) ABSTRACT

A fuel supply arrangement with a fuel supply duct that supplies fuel from a fuel storage reservoir to a fuel cell. The fuel supply duct is between a fuel provision port and a fuel supply port, and a fuel circulation duct is connected to the fuel supply duct to return unconsumed fuel from the fuel cell to the fuel supply duct. A jet nozzle in the fuel supply duct uses negative flow pressure, draws unconsumed fuel from the fuel circulation duct and mixes it into the fuel supply duct. A bypass duct connected to the fuel supply duct bypasses the jet nozzle. A pressure monitoring device monitors pressure in the fuel supply duct and outputs a signal when the pressure drops below a specific value. An activation device activates the bypass duct in response to the signal to bypass the jet nozzle to supply fuel to the fuel cell.

13 Claims, 2 Drawing Sheets

(51) Int. Cl.

| | | |
|---|---|---|
| *H01M 8/04029* | (2016.01) | |
| *H01M 8/04089* | (2016.01) | |
| *H01M 8/04119* | (2016.01) | |
| *H01M 8/04291* | (2016.01) | |
| *H01M 8/0438* | (2016.01) | |
| *H01M 8/04746* | (2016.01) | |

(52) U.S. Cl.
CPC ... *H01M 8/04388* (2013.01); *H01M 8/04753* (2013.01); *H01M 8/04029* (2013.01); *H01M 8/04164* (2013.01); *H01M 8/04291* (2013.01); *Y02E 60/50* (2013.01)

(56) References Cited

U.S. PATENT DOCUMENTS

| | | |
|---|---|---|
| 2006/0194091 A1 | 8/2006 | Strohl et al. |
| 2007/0248858 A1 | 10/2007 | Blaszczyk et al. |
| 2013/0171531 A1 | 7/2013 | Ikezoe et al. |
| 2016/0204454 A1 | 7/2016 | Hakala |
| 2017/0155159 A1 | 6/2017 | Arendt et al. |

FOREIGN PATENT DOCUMENTS

| | | | |
|---|---|---|---|
| DE | 102014212835 A1 | | 1/2016 |
| EP | 2618416 A1 | | 7/2013 |
| JP | 2014154385 A | * | 8/2014 |

OTHER PUBLICATIONS

International Search Report and Written Opinion issued in PCT/EP2017/082905, mailed on Feb. 2, 2018, 14 pages.
German Search Report issued in DE10206125165.8, mailed Aug. 24, 2017, 12 pages.

* cited by examiner

FUEL SUPPLY ARRANGEMENT FOR A FUEL CELL SYSTEM AND FUEL CELL SYSTEM

BACKGROUND OF THE INVENTION

Field of the Invention

The present invention relates to a fuel supply arrangement for a fuel cell system comprising a fuel provision port in for connection to a fuel storage reservoir for storing fuel and a fuel supply port for connection to a fuel cell assembly for generating electrical energy. A fuel supply duct serves to supply fuel from the fuel storage reservoir to the fuel cell assembly and is disposed between the fuel provision port and the fuel supply port. Furthermore, there is provided a fuel circulation duct that is connected to the fuel supply duct to return unconsumed fuel from the fuel cell assembly into the fuel supply duct. Also, a passive jet nozzle assembly is provided which is disposed in the fuel supply duct and configured to draw or suck unconsumed fuel from the fuel circulation duct using negative flow pressure and to mix the same into the fuel supply duct for supply to the fuel cell assembly.

Description of the Related Art

Fuel cells operated with such an arrangement generate electrical energy from a fuel, in particular hydrogen, and an oxidant, in particular oxygen. Oxygen is usually supplied in the form of air, and hydrogen is supplied from a storage reservoir or generated locally, for example from methanol. A common variant for both mobile and stationary fuel cell systems is the hydrogen supply from high-pressure tanks. In the high-pressure tanks, hydrogen is stored under a pressure of up to 80 MPa (800 bar). One or more high-pressure tanks can form a tank module. At the outlet of the tank module, the pressure is reduced by means of a pressure reducer to a manifold pressure level. In this medium pressure range, the pressure is typically about 0.5-1.2 MPa (5-12 bar).

The fuel cells are usually combined into one or more fuel cell stacks and together with numerous peripheral elements, such as lines for supplying fresh operating gases and cooling water, for the discharge and/or recirculation of used operating gases and cooling water, with treatment facilities for these operating media, sensors, valves, regulators, etc., without which the operation of the fuel cells would not be possible, constitute a fuel cell system which is often combined in one or more fuel cell modules. A supply line connects the tank module to the fuel cell module, that is to say with the fuel cells installed in a housing and the required peripheral elements.

Such an arrangement is known for example from DE 102 51 878 A1 and DE 10 2006 037 799 A1. A fuel circuit of the fuel cell system in which a fuel pump can be throttled in a possible control/regulating operation of the energy consumption and, together with this, the fuel circulation flow rate can be ensured in the time in which the performance of a fuel cell changes, comprises a fuel cell which generates electrical energy by being fed with fuel and with an oxidant, a fuel supply duct for supplying fuel to the fuel cell, a fuel circulation duct for causing unconsumed fuel discharged from the fuel cell to flow into the fuel supply duct for recycling, a fuel pump (hydrogen pump) which draws or sucks in and ejects unconsumed fuel, and an ejector (also often referred to as jet nozzle) which sucks or draws unconsumed fuel by using negative pressure generated when fuel flows, and causes the same to be mixed into the fuel which is then fed into the fuel cell.

For ensuring stable operation of a fuel cell, it is generally necessary to keep the flow rate on the hydrogen side above a certain value (about 3 m/s). This is possible either actively (using drive energy) via the use of a pump, or passively by means of a jet nozzle. A jet nozzle has the advantage over a pump that it circulates the fuel in the fuel circulation duct without the use of electrical energy, there are no wearing parts and that it develops no to almost no noise emission. Passive jet nozzles use the pressure difference between the drive pressure and the outlet pressure to create a vacuum or negative pressure on the suction side and thus a flow.

This can be a disadvantage in the case of an as efficient as possible use of fuel storages (such as fuel storage reservoirs). In one application, the drive pressure at the maximum operating point should be about 8 to 9 bar in order to operate the jet nozzle efficiently. However, in order to be able to use a storage as efficiently as possible, it must be possible to discharge the same to the lowest possible pressure (near atmospheric pressure). When using a jet nozzle, this entails that either the storage cannot be utilized fully, because it must be operated at a higher operating pressure, or the system cannot be used over the entire storage content in its entire performance range. Conversely, this means that the system cannot be circulated by means of a jet nozzle, if the entire storage content is to be used, but that use must be made of a fuel pump, which in turn reduces the efficiency among others.

BRIEF SUMMARY OF THE INVENTION

It is the object of the present invention to indicate a fuel supply arrangement for a fuel cell system of the type mentioned at the beginning, which can be operated efficiently in a relatively large operating range, making use of a fuel storage reservoir and a jet nozzle.

The invention relates to a fuel supply arrangement for a fuel cell system according to claim 1. Furthermore, the invention relates to a fuel cell system comprising such a fuel supply arrangement and a fuel cell assembly.

According to one aspect, the invention relates to a fuel supply arrangement for a fuel cell system, comprising: a fuel provision port for connection to a fuel storage reservoir for storing fuel and a fuel supply port for connection to a fuel cell assembly for generating electrical energy, a fuel supply duct for the supply of fuel from the fuel storage reservoir to the fuel cell assembly, said fuel supply duct being disposed between the fuel provision port and the fuel supply port, a fuel circulation duct connected to the fuel supply duct for returning unconsumed fuel from the fuel cell assembly to the fuel supply duct, and a passive jet nozzle assembly disposed in the fuel supply duct and configured to suck or draw unconsumed fuel from the fuel circulation duct using negative flow pressure and to mix the same into the fuel supply duct for supply to the fuel cell assembly. A bypass duct is connected to the fuel supply duct in parallel to the jet nozzle assembly in order to bridge or bypass the jet nozzle assembly in the fuel supply duct. A pressure monitoring device disposed in the fuel supply duct between the fuel provision port and the jet nozzle assembly is configured to monitor a pressure in the fuel supply duct and to output at least one output signal when the pressure drops below a specific pressure value. An activation device connected to the pressure monitoring device is configured to activate the bypass duct in response to the output signal of the pressure monitoring device for bypassing the jet nozzle assembly for the supply of fuel to the fuel cell assembly.

The invention provides the advantage that when the flow pressure drops as a result of an emptying fuel storage reservoir, the jet nozzle assembly can be bridged or bypassed in the fuel supply duct, so that there are no restrictions in case of decreasing operating pressure in this operating region. In a case in which the circulation in the fuel circulation duct is to be maintained, there may be provided a fuel pump adapted to achieve this instead of the jet nozzle assembly. Thus, in this case, additional drive energy for the fuel pump is required only in an operating range in which the flow pressure in the fuel supply duct decreases below the specific pressure value and the circulation in the fuel circulation duct is to be maintained. This renders possible a largely efficient operation, while providing at the same time the possibility to empty the fuel storage reservoir largely or almost completely.

In accordance with an embodiment of the invention, the fuel supply arrangement comprises furthermore a fuel pump connected to the fuel circulation duct and connected in parallel to the jet nozzle assembly between the fuel circulation duct and the fuel supply port in order to suck or draw unconsumed fuel from the fuel circulation duct and to mix the same into the fuel supply duct for supply to the fuel cell assembly. The fuel pump is connected to the pressure monitoring device and configured to be operated in a pumping mode, in particular to be activated for the pumping operation, in response to the output signal of the pressure monitoring device.

For efficient operation, it is advantageous if the fuel pump is switched to the inactive state, when the pressure monitoring device indicates that the pressure has not dropped below the specific pressure value, when the pressure in the fuel supply duct is thus above the pressure value. In this case, only the jet nozzle assembly is active for the mixing in of unconsumed fuel.

This offers the possibility to react to the situation that in the further course of a decreasing storage pressure below the required drive pressure of for example 8 to 9 bar, the power of the fuel cell system does not have to be reduced since the recirculation of the fuel can be maintained by the fuel pump. For efficient operation of the fuel cell system, the fuel pump is advantageously otherwise inactive.

In an embodiment, the fuel supply arrangement comprises furthermore a check or non-return device which is disposed in the fuel circulation duct upstream of the suction side of the jet nozzle assembly and configured to prevent backflow of fuel across the jet nozzle assembly into the fuel circulation duct when the fuel pump is in the pumping mode. It can thus be prevented that the fuel pump in the active pumping mode circulates the fuel in backward direction across the jet nozzle.

In particular, the check device comprises a non-return valve or a check valve.

In an embodiment, the fuel supply arrangement comprises a directional control valve which is arranged in the fuel supply duct upstream of the jet nozzle assembly and, in a first switching position, permits the flow of fuel from the fuel storage reservoir into the jet nozzle assembly and, in a second switching position, permits the flow of fuel from the fuel storage reservoir into the bypass duct. Here, the directional control valve is arranged to switch from the first switching position to the second switching position in response to the output signal of the pressure monitoring device. It can thus be achieved that, when the pressure in the fuel supply duct drops below a set value, a directional control valve, in particular a 3/2-way valve, is automatically switched and thus the jet nozzle is bypassed via the bypass duct.

According to a further embodiment, the fuel supply arrangement comprises a valve which is disposed in the bypass duct and, in a first switching position, prevents the flow of fuel in the bypass duct and, in a second switching position, permits the flow of fuel in the bypass duct, wherein the valve is configured to switch from the first switching position to the second switching position in response to the output signal of the pressure monitoring device. It can thus be achieved that, when the pressure in the fuel supply duct falls below a set value, a valve in the bypass duct, in particular a 2/2-way valve, is automatically switched and thus the bypass duct is blocked or opened, wherein in the latter case, the jet nozzle is bypassed via the opened bypass duct (which represents a lower flow resistance than the jet nozzle).

According to an embodiment, the pressure monitoring device comprises a pressure switch or a pressure transmitter, which is configured to monitor the pressure in the fuel supply duct and to trigger the output signal.

In an embodiment, the pressure monitoring device is configured to output the output signal when the pressure drops below a pressure value within a range between 8 and 9 bar. Thus, the supply pressure can be monitored to a value of 8 to 9 bar (g) (relative pressure to the outside environment).

In particular, the pressure monitoring device is arranged upstream of a pressure reducer which is configured to set a pre-pressure at the fuel supply port in accordance with a target setting. In order to reduce possible feedback situations during the control operation, the pressure reducer advantageously has a proportional pressure reducer which, according to its adjustable position, can set the fuel flow volume continuously or in several stages proportionally.

BRIEF DESCRIPTION OF THE DRAWINGS

The invention will be explained in more detail in the following, making reference to the accompanying drawings, in which.

DETAILED DESCRIPTION OF THE INVENTION

Figure 1:
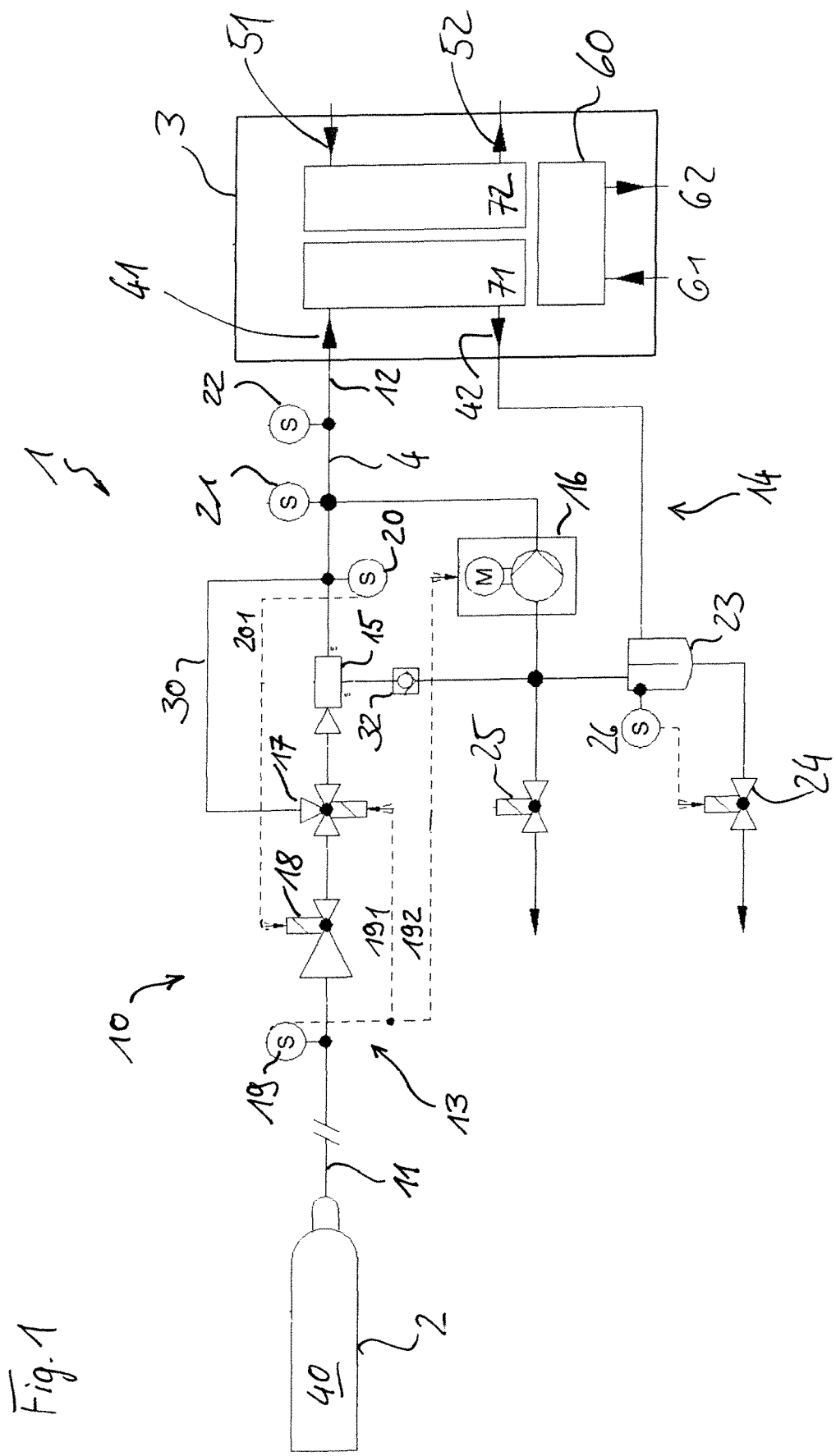
FIG. 1 shows an embodiment of a fuel cell system according to the invention, comprising a fuel storage reservoir, an embodiment of a fuel supply arrangement according to the invention and a fuel cell assembly supplied by the same, for example a so-called fuel cell stack.

FIG. 1 schematically illustrates an embodiment of a fuel cell system 1 according to the invention, comprising a fuel storage reservoir 2, an embodiment of a fuel supply arrangement 10 according to the invention and a fuel cell assembly 3 supplied by the same (for example a fuel cell module or a fuel cell stack). The latter serves to generate electrical energy from the reaction of a fuel, here hydrogen, with an oxidant, in particular oxygen, according to the known principle of a fuel cell. For example, the fuel cell system 1 comprises a tank module 2 (in principle, any type of suitable fuel storage reservoir can be used) and a fuel cell stack 3, wherein hydrogen 40 can flow from the tank module 2 via a fuel supply arrangement 10 into the fuel cell stack 3.

For this purpose, the fuel supply arrangement 10 has a fuel provision port 11 for connection to the tank module 2 and a fuel supply port 12 for connection to the fuel cell stack 3. The fuel supply arrangement 10 may be provided in modular form and may be provided and connected separately to the tank module 2 and/or the fuel cell stack 3, or may also be integrated in a common fuel cell module housing together with the fuel cell stack 3. Also, the tank module 2 may be integrated in such a housing, or be provided separately therefrom. A fuel supply duct 13 serves to supply fuel from the tank module 2 to the fuel cell stack 3 via a supply line 4 and is disposed between the fuel provision port 11 and the fuel supply port 12.

Hydrogen 40 can flow from the tank module 2 to a pressure reducer 18 via the fuel provision port 11 of a hydrogen line. The pressure reducer 18, in cooperation with the pressure sensor 20 which determines the pressure of the gas mixture in the supply line 4 and continuously measures the pressure and outputs a corresponding signal 201, compares the pressure at the fuel supply port 12 with a target setting and allows the medium to flow to maintain said pressure. Preferably, the pressure reducer 18 for this purpose comprises a proportional pressure reducer. At the fuel supply port 12, the supply line 4 is connected to the fuel cell stack 3. A pressure switch 21 monitors the pressure of the hydrogen in the supply line 4 and switches the system via a safety circuit into a safe state when the maximum pressure is exceeded, but only in case of failure when the pressure in the gas mixture rises above the maximum pressure. Alternatively or additionally (for example as a redundancy to the pressure switch 21), a pressure switch 22 can be provided which likewise monitors the pressure of the hydrogen in the supply line 4 and switches the system to a safe state via a safety circuit when the maximum pressure is exceeded, this again only in case of failure when the pressure in the gas mixture rises above the maximum pressure. From the fuel supply port 12, hydrogen 41 flows through a hydrogen supply line into the fuel cell assembly 3.

Anode exhaust gas, which may also contain unconsumed hydrogen 42, leaves the fuel cell assembly 3 through an anode exhaust gas line of the anode 71 and is directed into a fuel circulation duct 14. The latter serves to mix unconsumed hydrogen 42 into the fuel supply duct 13 for renewed supply to the fuel cell assembly 3. Cathode operating gas (in particular oxygen) enters the fuel cell assembly 3 through an air supply line 51 and leaves the same again through a cathode exhaust gas line 52 of the cathode 72. Cooling water enters the fuel cell assembly 3 through a cooling water supply line 61 of a cooling device 60 and leaves the same through a cooling water discharge line 62.

The anode exhaust gas directed into the fuel circulation duct 14 is passed across a water separator 23, which separates liquid water from the gas stream and collects the same as soon as liquid water is contained in the flowing gas mixture. A level switch 26 monitors the filling level of the water separator 23 and on reaching the maximum filling level, opens the water drain valve 24 as soon as the water in the water separator 23 wets the switch. Upon switching of the level switch 26, the water drain valve 24 is opened and the water discharged from the water separator 23. The water drain valve 24 closes after a predefined time, after which enough water has been drained from the water separator 23, but gas is not yet present at the water drain valve. A gas discharge valve 25 serves to discharge the gas from the system into the atmosphere. Mostly, regular opening is carried out during operation.

Furthermore, a passive jet nozzle assembly 15 is provided, which is arranged in the fuel supply duct 13 and is configured to suck or draw unconsumed fuel 42 from the fuel circulation duct 14 by using negative flow pressure, and to mix the same into the fuel supply duct 13 for supply to the fuel cell assembly 3. In order to ensure the stable operation of a fuel cell, it is generally necessary to keep the flow rate on the hydrogen side above a certain value (about 3 m/s). This is possible either actively, by way of the use of a fuel pump, or passively, by means of a jet nozzle assembly.

In particular, the jet nozzle assembly comprises a jet nozzle which in particular is a passive jet nozzle. This nozzle is in particular of known construction. The jet nozzle assembly, in addition to the jet nozzle, may have additional associated components, such as valves or the like. A jet nozzle has many advantages over a pump, it provides circulation without the use of electrical energy, there are no wearing parts and it develops no to almost no noise emission. Passive jet nozzles use the pressure difference between the drive pressure and the outlet pressure for creating a vacuum or negative pressure on the suction side and thus a flow. However, this can be a disadvantage in the case of an as efficient as possible use of fuel storage reservoirs, when the drive pressure in the maximum operating point should be at about 8 to 9 bar (g). For permitting a storage to be used as efficiently as possible, it must be possible to discharge the same to the lowest possible pressure (near atmospheric pressure). When a jet nozzle is used, this necessarily has to the effect that the storage cannot be fully utilized, that the system cannot be used over the entire storage content in its entire performance range, or that the system cannot be circulated by means of a jet nozzle when the entire storage content is to be utilized.

The present invention provides a remedy in this regard by providing a pressure monitoring device 19 in the fuel supply duct 13 between the fuel provision port 11 and the jet nozzle assembly 15. This device monitors a pressure in the fuel supply duct 13, in particular in the supply line 4, preferably upstream of the pressure reducer 18, and outputs at least one output signal (in the present embodiment, two output signals 191, 192) when the pressure drops below a specific pressure value. In a preferred embodiment, this happens when the pressure drops below a pressure value within a range between 8 and 9 bar. The pressure value may be predefined or preset and/or may also be set or adjusted dynamically e.g. in accordance with the load requirement.

Furthermore, there is provided a bypass duct 30 which is connected to the fuel supply duct 13 in parallel to the jet nozzle assembly 15 in order to bypass the jet nozzle assembly 15 in the fuel supply duct 13. In particular, the bypass duct 30 is connected on the input side to an input and on the output side to an output of the jet nozzle assembly 15. Depending on the particular application, other elements, such as valves or the like, which are part of or associated with the jet nozzle assembly, may also be bridged or bypassed by the bypass duct 30.

In the embodiment of FIG. 1, a directional control valve 17 is further provided, which is arranged in the fuel supply duct 13 upstream of the jet nozzle assembly 15. The directional control valve 17 is in particular a 3/2-way valve. In a first switching position, the directional control valve 17 allows the flow of fuel from the fuel storage reservoir 2, and thus from the fuel provision port 11 into the jet nozzle assembly 15. The bypass duct 30 is closed in this case by the directional control valve 17. In a second switching position, the directional control valve 17 allows the flow of fuel from the fuel storage reservoir 2 into the bypass duct 30. The fuel supply duct 13 through the jet nozzle assembly 15 is closed in this case by the directional control valve 17. The directional control valve 17, in response to the output signal 191 of the pressure monitoring device 19, accordingly switches from the first switching position to the second switching position. For example, the pressure monitoring device 19 is or includes a pressure switch or pressure transmitter arranged and configured to monitor the pressure in the fuel supply duct 13, in particular in the supply line 4, and to trigger the output signal(s) 191, 192 when the pressure reaches the set pressure value or falls below the same. For example, the pressure switch or pressure transmitter is closed in the inoperative state and in case of safety (i.e., there is no output signal output in this case). Other types of measuring transducers can be used as well.

In other words, there is provided a pressure monitoring device 19 which monitors the supply pressure in the fuel supply duct 13. This supply pressure is set or monitored to a value of e.g. 8 to 9 bar (g). When the pressure drops below the set value, the directional control valve 17, which in the instant case is arranged downstream of the pressure reducer 18 in the direction of flow, is automatically switched, and thus the jet nozzle assembly 15 is bypassed. Thus, the directional control valve 17 functions as an activation device which is connected to the pressure monitoring device 19 and in response to the output signal 191 of the pressure monitoring device 19 activates the bypass duct 30 for bypassing the jet nozzle assembly 15 for the supply of fuel to the fuel cell arrangement 3.

Thus, the fuel cell system 1 can be operated in energy-saving and efficient manner in the case of a filled fuel storage reservoir 2 by means of the jet nozzle assembly 15. However, in order that the power may not have to be reduced in the further course of a decreasing storage pressure pressure below the required drive pressure of about 8 to 9 bar (g), a fuel pump 16 is provided in addition which is connected to the fuel circulation duct 14 and is connected in parallel to the jet nozzle assembly 15 between the fuel circulation duct 14 and the fuel supply port 12. In active operation (pumping operation), the fuel pump 16 sucks or draws unconsumed fuel 42 from the fuel circulation duct 14 and mixes the same into the fuel supply duct 13 downstream of the jet nozzle assembly 15 for supply to the fuel cell assembly 3. For rendering possible energy-saving and efficient operation of the fuel cell system 1, the fuel pump 16 is operated only temporarily. According to the invention, it is provided in this regard that the fuel pump 16 is connected to the pressure monitoring device 19 and receives an output signal 192 of the same, which may be the same or corresponding to the output signal 191 or may also be different from the same as regards signal technology. The output signal 192, like the output signal 191, is output when the pressure falls below the specific pressure value in the fuel supply duct 13, and when this is detected by the pressure monitoring device 19.

The fuel pump 16 is configured to to be operated in a pumping mode in response to the output signal 192 of the pressure monitoring device 19. In particular, in the event that the fuel pump 16 is deactivated or in an inoperative state in the case of a filled fuel storage reservoir 2, the fuel pump 16 is activated for the pumping operation in response to the output signal 192. That is, when the pressure in the fuel supply duct 13 at the location of the pressure monitoring device 19 drops below the set value, the jet nozzle assembly 15 is bridged or bypassed as described and at the same time the fuel pump 16 associated in parallel with the jet nozzle assembly 15 is activated. Thus, the performance of the fuel cell system 1 can be maintained even with decreasing storage pressure, and efficient operation is rendered possible at the same time because the fuel pump 16 is operated only temporarily and as needed.

Thus, the invention in principle renders possible the following advantageous combination of modes of operation:

"Jet nozzle active (bypass duct inactive) and fuel pump inactive" in case of sufficient supply pressure (i.e. pressure in the fuel supply duct 13 is at or above the monitored pressure value; pressure monitoring device 19 indicates that the pressure has not fallen below the specific pressure value) and "Bypass duct active (jet nozzle inactive) and fuel pump active" in case of insufficient supply pressure (i.e., the pressure in the fuel supply duct 13 is accordingly at or below the monitored pressure value; pressure monitoring device 19 indicates that the pressure has fallen below the specific pressure value).

In order to prevent that the fuel pump 16, in the active state, circulates the hydrogen backwards across the jet nozzle assembly 15, there is provided a check or non-return device 32 upstream of the suction side of the jet nozzle, which prevents this. The check device 32 is disposed in the fuel circulation duct 14 upstream of the suction side of the jet nozzle assembly 15 and is configured to prevent backflow of fuel across the jet nozzle assembly 15 into the fuel circulation duct 14 when the fuel pump 16 is in pumping operation. For example, the check device 32 comprises a non-return valve or a check valve.

Figure 2:
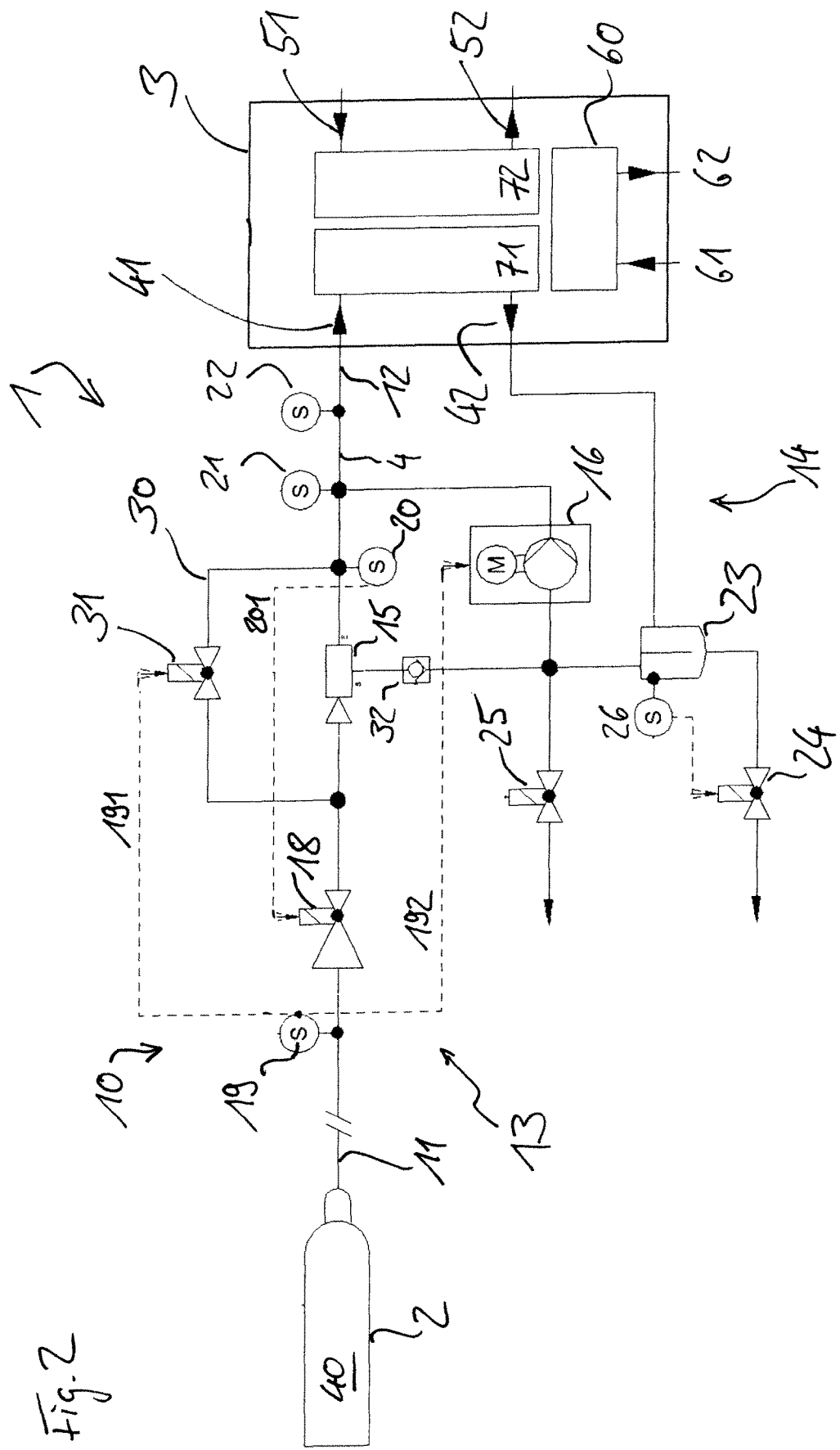
FIG. 2 shows a further embodiment of a fuel cell system according to the invention, comprising a fuel storage reservoir, a further embodiment of a fuel supply arrangement according to the invention and a fuel cell assembly supplied by the same.

FIG. 2 shows a further embodiment of a fuel cell system according to the invention, comprising a fuel storage reservoir, a further embodiment of a fuel supply arrangement according to the invention and a fuel cell assembly supplied by the same. The embodiment according to FIG. 2 is in large parts similar to the embodiment according to FIG. 1, in which the same reference numerals have been used accordingly, so that the structure and operation of the fuel cell system 1 and the fuel supply arrangement 10 will not be described again in this regard. In this respect, reference is made to the corresponding statements to FIG. 1. Otherwise, this embodiment allows the same operation and advantages as described hereinbefore with respect to the embodiment of FIG. 1.

In contrast to the embodiment of FIG. 1, the embodiment of FIG. 2 has a valve 31 provided in the bypass duct 30, in particular a 2/2-way valve. This is provided in FIG. 2 instead of the 3/2-way valve 17 in FIG. 1. In a first switching position, the valve 31 prevents the flow of fuel in the bypass duct 30, and in a second switching position, the valve 31 permits the flow of fuel in the bypass duct 30. The valve 31 receives the output signal 191 of the pressure monitoring device 19 and is configured to switch from the first switching position to the second switching position in response to the output signal 191 of the pressure monitoring device 19.

Thus, according to the embodiment of FIG. 2, there is also provided a pressure monitoring device 19 which monitors the supply pressure in the fuel supply duct 13. This pressure is adjusted or set e.g. to a value of 8 to 9 bar (g). When the pressure falls below the set value, the valve 31 in the bypass duct 30 is automatically switched to permit flow therethrough, thus bypassing the jet nozzle assembly 15 (the opened bypass duct 30 represents a lower flow resistance than the jet nozzle). Thus, the valve 31 functions as an activation device which is connected to the pressure monitoring device 19 and, in response to the output signal 191 of the pressure monitoring device 19, activates the bypass passage 30 for bypassing the jet nozzle assembly 15 for supplying fuel to the fuel cell assembly 3. When a fuel pump 16 is provided, it is driven in the same way via the output signal 192, as already described with reference to FIG. 1.

What is claimed is:

1. A fuel supply arrangement for a fuel cell system comprising:
    a fuel provision port connected to a fuel storage reservoir that stores fuel,
    a fuel supply port configured to connect to a fuel cell that generates electrical energy,
    a fuel supply duct that supplies fuel from the fuel storage reservoir to the fuel cell, wherein said fuel supply duct is arranged between the fuel provision port and the fuel supply port,
    a fuel circulation duct connected to the fuel supply duct that returns unconsumed fuel from the fuel cell to the fuel supply duct,
    a passive jet nozzle disposed in the fuel supply duct and configured to
        suck the unconsumed fuel from the fuel circulation duct using negative flow pressure, and
        mix the unconsumed fuel into the fuel supply duct to supply to the fuel cell,
            such that a flow rate of the fuel is kept above a predetermined value,
    a bypass duct connected to the fuel supply duct in parallel to the passive jet nozzle that bypasses the passive jet nozzle in the fuel supply duct, wherein the bypass duct is connected on an input side to an input and on an output side to an output of the passive jet nozzle,
    a pressure monitoring device disposed in the fuel supply duct between the fuel provision port and the passive jet nozzle, wherein the pressure monitoring device is programmed to monitor a pressure in the fuel supply duct and programmed to output at least one output signal when the pressure drops below a specific pressure value which indicates that the pressure is below the specific pressure value while the fuel supply arrangement is operating in a first mode of operation,
    an activation device connected to the pressure monitoring device which is programmed to activate a second mode of operation in which the bypass duct is activated, wherein the second mode of operation is activated in response to the at least one output signal of the pressure monitoring device indicating that the pressure is below the specific pressure value, to bypass the passive jet nozzle to supply fuel to the fuel cell, and
    a fuel pump connected to the fuel circulation duct and connected in parallel to the passive jet nozzle between the fuel circulation duct and the fuel supply port to, in active pumping mode,
        suck the unconsumed fuel from the fuel circulation duct, and
        mix the unconsumed fuel into the fuel supply duct to supply to the fuel cell downstream of the passive jet nozzle,
    wherein the fuel pump is further connected to the pressure monitoring device and operates in said active pumping mode programmed to activate a pumping operation only temporarily as needed, such that said active pumping mode is in an inactive state and is activated in response to the at least one output signal of the pressure monitoring device which indicates that the pressure is below the specific pressure value,
    such that when the pressure in the fuel supply duct at a location of the pressure monitoring device drops below the specific pressure value, the passive jet nozzle is bypassed and simultaneously the fuel pump associated in parallel with the passive jet nozzle is activated, and
    such that the fuel supply arrangement is programmed to operate in two modes of operation comprising transitioning from the first mode of operation to the second mode of operation, wherein said two modes of operation are dependent on said specific pressure value in the fuel supply duct, said two modes of operation comprising
        the first mode of operation while the pressure drops below the specific pressure value, and with
            the passive jet nozzle active,
            the bypass duct inactive,
            the fuel pump inactive, and
        the second mode of operation when the at least one output signal has been outputted after the pressure drops below the specific pressure value, and with
            the bypass duct active,
            the passive jet nozzle inactive,
            the fuel pump active.

2. The fuel supply arrangement of claim 1, wherein the fuel pump is switched to the inactive state when the pressure monitoring device indicates that the pressure has not dropped below the specific pressure value.

3. The fuel supply arrangement of claim 1, further comprising a check device disposed in the fuel circulation duct upstream of a suction side of the passive jet nozzle and configured to prevent backflow of fuel across the passive jet nozzle into the fuel circulation duct when the fuel pump is in the active pumping mode.

4. The fuel supply arrangement of claim 3, wherein the check device comprises a check valve or a non-return valve.

5. The fuel supply arrangement of claim 1, further comprising:
    a directional control valve disposed in the fuel supply duct upstream of the passive jet nozzle and, in a first switching position, permits a flow of fuel from the fuel storage reservoir into the passive jet nozzle and, in a second switching position, permits the flow of fuel from the fuel storage reservoir into the bypass duct,
    wherein the directional control valve is configured to switch from the first switching position to the second switching position in response to the at least one output signal of the pressure monitoring device which indicates that the pressure is below the specific pressure value.

6. The fuel supply arrangement of claim 1, further comprising:
    a valve disposed in the bypass duct and, in a first switching position, prevents a flow of fuel in the bypass duct and, in a second switching position, permits the flow of fuel in the bypass duct,
    wherein the valve is configured to switch from the first switching position to the second switching position in response to the at least one output signal of the pressure monitoring device which indicates that the pressure is below the specific pressure value.

7. The fuel supply arrangement of claim 1, wherein the pressure monitoring device comprises a pressure switch or a pressure transmitter, and wherein the pressure switch or pressure transmitter is configured to monitor the pressure in the fuel supply duct and to trigger the at least one output signal which indicates that the pressure is below the specific pressure value.

8. The fuel supply arrangement of claim 1, wherein the pressure monitoring device outputs the at least one output signal when the pressure drops below a pressure value within a range between 8 and 9 bar.

9. The fuel supply arrangement of claim 1, wherein the pressure monitoring device is arranged upstream of a pressure reducer, and wherein the pressure reducer is configured to set a pre-pressure at the fuel supply port in accordance with a target setting.

10. The fuel supply arrangement of claim 9, wherein the pressure reducer comprises a proportional pressure reducer.

11. A fuel cell system comprising:
a fuel supply arrangement, and
a fuel cell configured to generate electrical energy,
wherein the fuel supply arrangement comprises
 a fuel provision port connected to a fuel storage reservoir that stores fuel,
 a fuel supply port connected to the fuel cell that generates the electrical energy,
 a fuel supply duct that supplies fuel from the fuel storage reservoir to the fuel cell, wherein said fuel supply duct is arranged between the fuel provision port and the fuel supply port,
 a fuel circulation duct connected to the fuel supply duct that returns unconsumed fuel from the fuel cell to the fuel supply duct,
 a passive jet nozzle disposed in the fuel supply duct and configured to
  suck the unconsumed fuel from the fuel circulation duct using negative flow pressure, and
  mix the unconsumed fuel into the fuel supply duct to supply to the fuel cell, such that a flow rate of the fuel is kept above a predetermined value,
 a bypass duct connected to the fuel supply duct in parallel to the passive jet nozzle that bypasses the passive jet nozzle in the fuel supply duct, wherein the bypass duct is connected on an input side to an input and on an output side to an output of the passive jet nozzle,
 a pressure monitoring device disposed in the fuel supply duct between the fuel provision port and the passive jet nozzle, wherein the pressure monitoring device is programmed to monitor a pressure in the fuel supply duct and programmed to output at least one output signal when the pressure drops below a specific pressure value which indicates that the pressure is below the specific pressure value while the fuel supply arrangement is operating in a first mode of operation,
 an activation device connected to the pressure monitoring device which is programmed to activate a second mode of operation in which the bypass duct is activated, wherein the second mode of operation is activated in response to the at least one output signal of the pressure monitoring device indicating that the pressure is below the specific pressure value, to bypass the passive jet nozzle to supply fuel to the fuel cell, and
 a fuel pump connected to the fuel circulation duct and connected in parallel to the passive jet nozzle between the fuel circulation duct and the fuel supply port to, in active pumping mode,
  suck the unconsumed fuel from the fuel circulation duct, and
  mix the unconsumed fuel into the fuel supply duct to supply to the fuel cell downstream of the passive jet nozzle,
 wherein the fuel pump is further connected to the pressure monitoring device and operates in said active pumping mode programmed to activate a pumping operation only temporarily as needed, such that said active pumping mode is in an inactive state and is activated in response to the at least one output signal of the pressure monitoring device which indicates that the pressure is below the specific pressure value,
 such that when the pressure in the fuel supply duct at a location of the pressure monitoring device drops below the specific pressure value, the passive jet nozzle is bypassed and simultaneously the fuel pump associated in parallel with the passive jet nozzle is activated, and
 such that the fuel supply arrangement is programmed to operate in two modes of operation comprising transitioning from the first mode of operation to the second mode of operation, wherein said two modes of operation are dependent on said specific pressure value in the fuel supply duct, said two modes of operation comprising
  the first mode of operation while the pressure drops below the specific pressure value, and with
   the passive jet nozzle active,
   the bypass duct inactive,
   the fuel pump inactive, and
  the second mode of operation when the at least one output signal has been outputted after the pressure drops below the specific pressure value, and with
   the bypass duct active,
   the passive jet nozzle inactive,
   the fuel pump active.

12. The fuel supply arrangement of claim 1, wherein the specific pressure value is adjusted dynamically according to a load requirement.

13. The fuel cell system of claim 11, wherein the specific pressure value is adjusted dynamically according to a load requirement.

* * * * *